(No Model.)
R. G. CHASE.
PIPE COUPLING.
No. 424,463. Patented Apr. 1, 1890.
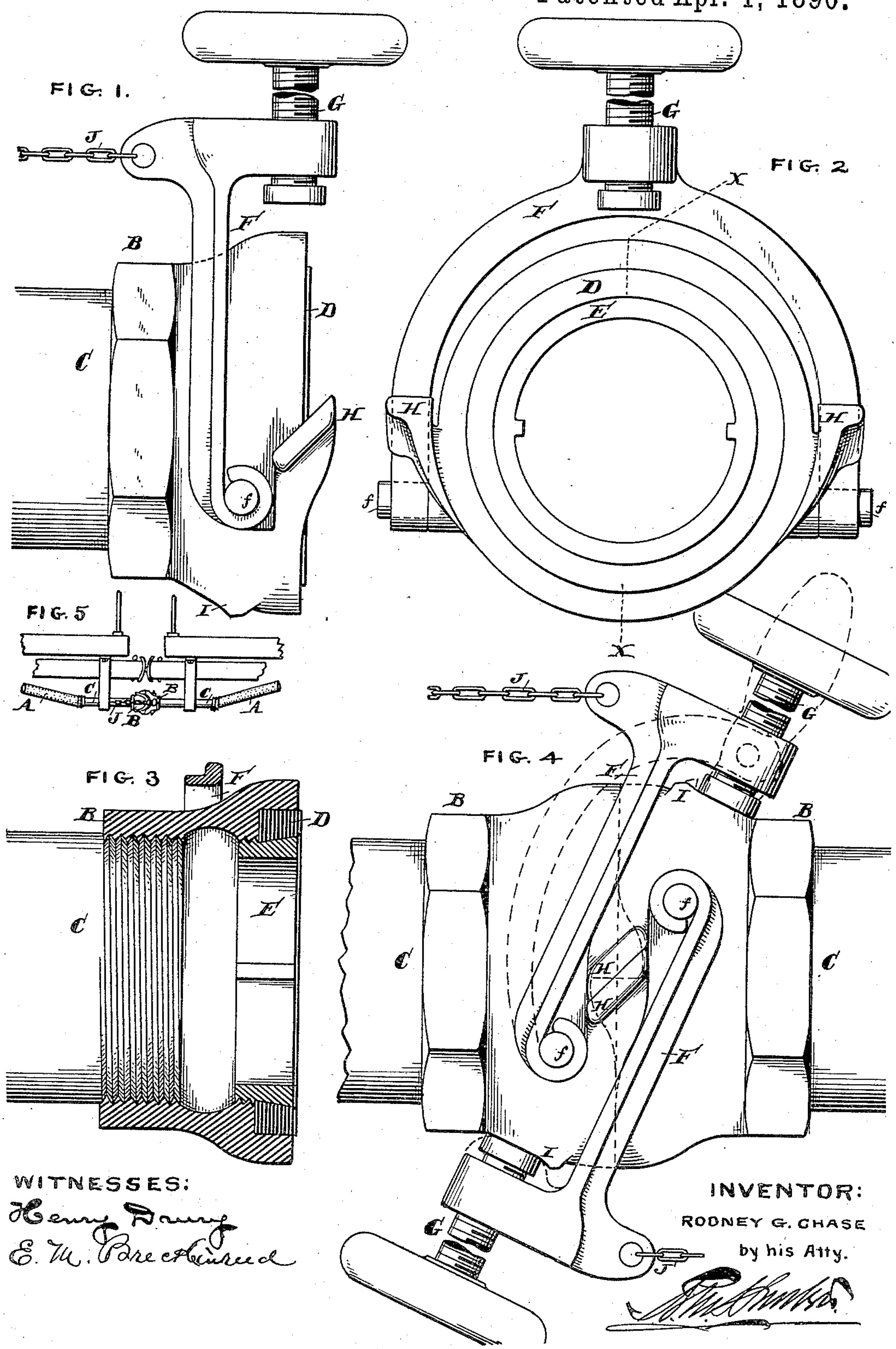
WITNESSES:
Henry Drury
E. M. Bretherwood
INVENTOR:
RODNEY G. CHASE
by his Atty.
N. PETERS, Photo-Lithographer, Washington, D. C.

UNITED STATES PATENT OFFICE.

RODNEY G. CHASE, OF BOSTON, MASSACHUSETTS.

PIPE-COUPLING.

SPECIFICATION forming part of Letters Patent No. 424,463, dated April 1, 1890.

Application filed April 27, 1889. Serial No. 308,843. (No model.)

*To all whom it may concern:*

Be it known that I, RODNEY G. CHASE, of Boston, county of Suffolk, State of Massachusetts, have invented an Improvement in Pipe-Couplings, of which the following is a specification.

My invention relates to pipe-couplings; and it consists of certain improvements which are fully set forth in the following specification and shown in the accompanying drawings, which form a part thereof.

More particularly my invention relates to rubber hose-couplings for railway-cars for steam or air pipes, with especial reference to steam-heating. Owing to the jolting of the cars and their turning curves in travel it is not possible to connect inflexible metallic pipes together for the purpose of circulating air or steam from one car to another, as they would quickly be twisted or broken. Therefore the steam or air is conducted from one car to another through rubber hose or flexible tubing coupled together, and my invention is concerned with the devices for coupling these pieces of hose or tubing together.

My object is to construct a coupling which shall be simple in construction, durable in use, and will tightly unite the parts, preventing the escape of steam or air, but at the same time allow the coupling-sections to be separated or torn apart should the cars become uncoupled through accident or otherwise without breaking or injuring the coupling, hose, or tubing.

In carrying out my invention I secure my coupling ends to the pieces of the hose in any suitable manner and provide the faces thereof with a circular packing of asbestus or other suitable material, so that when the two parts are butted together this packing will make the coupling-joint substantially air or steam tight. Each section of the coupling is provided with a pivoted yoke carrying a screw, and by these yokes the two sections are coupled together in the manner hereinafter more fully set out, so that a very tight coupling-joint is formed, but which will, however, be readily separated without injury to the couplings or tubing should the cars become uncoupled.

In the drawings, Figure 1 is a side elevation of one section of my improved coupling. Fig. 2 is an end view of the same. Fig. 3 is a sectional view on the line $x$ $x$ of Fig. 2. Fig. 4 is a side view showing the two sections coupled together, and Fig. 5 is a side elevation showing coupling attached to the cars.

A is the rubber hose or flexible tubing.

B is the coupling-section, consisting of a cylindrical piece of metal, to which the tubing A is secured. The tubing may be secured either directly to the end B or to a metal tube C, screwed into the end B.

D is a ring or washer of soft material, preferably asbestus, which is employed to make the coupling more tight when the ends are drawn together and is not affected by heat. In place of asbestus rubber may be used. It is apparent that this washer or ring D may be secured to the coupling end B in a variety of ways; but that shown in the drawings is preferred, in which the ring or washer D is clamped between the inner surface of the coupling end B and an internal ring E, screwed into it, allowing a circular rim of the washer to protrude beyond the face of the coupling-section.

F is a yoke pivoted to the coupling-section B at $f$ $f$ and provided with a screw G at its top. It is evident that by making the packing soft the screws might be dispensed with and the yokes fit directly upon the lugs, as shown in dotted lines. I prefer to make the top of the yoke shelving, or with an extension or flange to receive this screw.

H are lugs upon the edge of the coupling end B at the center of each side and extend somewhat beyond its faces. These lugs preferably have an incline of forty-five degrees.

I is a lug upon the coupling end B, upon which the screw G of another coupling is adapted to press. The couplings are similar in construction, but when coupled together are in opposite positions, as shown in Fig. 4. The two ends B are butted together, and the inclined lugs H of one coupling rest upon those of the other. Each yoke F is thrown over upon the other coupling, and the screw G screwed down upon the lug I. These lugs are so shaped that they are substantially concentric with the pivot-points $f$ $f$ on the opposite section when the coupling-sections are united. By this construction the yokes can be forcibly pulled off the lugs when necessary. The action of the screws G or lever G′ is to force the sections obliquely one upon the other, which causes the inclined lugs H to slide in contact and draw the sections of the coupling together. It will be seen that through the application of the mechanical principle of the inclined plane in the lugs H the force exerted upon the couplings by the screws G forcing these inclined lugs upon each other will bring the ends B tightly together, squeezing the washers or soft rings D together, forming an air or steam tight coupling with practically very little pressure from the screws G. In fact, it is demonstrated in practice that a quarter of a turn upon each screw is amply sufficient to form a perfectly tight coupling. The screws G are preferably formed with flattened ends and hand-wheels.

Each of the yokes F is connected with the frame of the car corresponding to its coupling end by a link or chain J, so that if any sudden separation of the cars takes place through accident without loosening the coupling these chains will immediately pull the yokes free from the lugs I, and thereby automatically uncouple the coupling-sections without injury. By employing this principle of the inclined plane the screws G need not be screwed down so tightly to obtain the required air and steam tight union that they cannot readily be pulled off the lugs I by the chains J in case of accident, and therein lies one of the important features of my invention. This coupling may be used on rigid pipes, if desired, but is especially designed for flexible pipes. The dotted lines in Fig. 4 show the lugs H when right angles to the joint of the coupling are employed.

In place of making the yokes straight in side elevation they may be curved, as shown in dotted lines, Fig. 4, and likewise a clamping-lever G′ may be used in place of the screw G.

It is apparent that the mere details of construction which are here shown are susceptible of modification without departing from the principles of my invention, and I do not therefore limit myself thereto.

Having now described my invention, what I claim as new, and desire to secure by Letters Patent, is—

1. The combination of two cars and their flexible pipes, two tubular metal sections secured to the pipes to be coupled, each of which is provided with a pivoted yoke inelastically pivoted to one section and adapted to fit over a rigid part on the other section to couple said ends together, and each of which is also provided with a lug inclined to the yoke, and which lugs are adapted to fit together to prevent the sections shifting laterally, and a connection between each of said yokes and the car-body, whereby when the cars become uncoupled said yokes will be released from the coupling-sections and automatically uncouple them.

2. The combination of two cars and their flexible pipes, two tubular metal sections secured to the pipes to be coupled, each of which is provided with a pivoted yoke adapted to fit over the other section to couple said ends together, screws carried by said yokes adapted to be screwed down upon said coupling-sections to force them together, and a connection between each of said yokes and the car-body, whereby when the cars become uncoupled said yokes will be released from binding action on the coupling-sections and automatically uncouple them.

3. In a coupling for pipes, the combination of two tubular metal sections secured to said pipes, and each of which sections is provided with lugs upon opposite sides of its face adapted to fit upon the corresponding lugs of the other section, and a pivoted clamping-yoke on each section acting across the plane of contact of the two sections to force said sections together.

4. In a coupling for pipes, the combination of two tubular metal sections secured to said pipes, and each of which sections is provided with lugs upon opposite sides of its face adapted to fit upon the corresponding lugs of the other section, and means, substantially as described, consisting of yokes pivoted to each of said coupling-sections, adapted to fit over the opposite section, and provided with hand-operated clamping devices to be forced down to force said sections together.

5. In a coupling for pipes, the combination of two tubular metal sections secured to said pipes and adapted to be brought together to make a tight joint, each of said sections having a packing to come into contact and give elasticity between the parts at plane of contact, lugs on their sides to come into contact and insure a movement of the sections toward each other, a yoke for each section, hinged directly to said section and adapted to encircle the other section, and adjustable clamping devices upon the free ends of the yokes to act upon the opposite section, the said yokes exerting a strain obliquely across the plane of contact of the two sections.

6. In a coupling for pipes, the combination of two tubular metal sections secured to said pipes and adapted to be brought together to make a tight joint, each of said sections having a packing of asbestus or non-combustible material to come into contact and give elasticity between the parts at plane of contact, lugs on their sides to come into contact and insure a movement of the sections toward each other, a yoke for each section, hinged directly to said section and adapted to encircle the other section, and adjustable clamping devices upon the free ends of the yokes to act upon the opposite section, the said yokes exerting a strain obliquely across the plane of contact of the two sections.

7. In a coupling for pipes, the combination of the tubular metal coupling-section B, provided on its face with a packing of soft material D, projecting slightly from said face, lugs H on each side of said coupling-section, adapted to fit upon corresponding lugs upon another coupling-section, and lug I, upon which the screw G of a corresponding coupling-section is adapted to press, and the pivoted yoke F, pivoted to the coupling-section and having a clamping-screw.

8. In a coupling for pipes, the combination of the tubular metal coupling-section B, provided on its face with a packing of soft asbestus material D, extending slightly from said face, lugs H on each side of said coupling-section, adapted to fit upon corresponding lugs upon another coupling-section, yoke F, provided with screw G, and chain or link J, connecting said yoke F with the car-body.

9. In a car-coupling for flexible tubes or pipes, the combination of the tubular metal coupling B, having the internal screw E, packing D, clamped between said coupling-section and its internal ring, and lugs H on each side of said coupling-section, adapted to fit upon corresponding lugs upon another coupling-section, and pivoted yoke F, pivoted to the coupling-section and having a clamping-screw G.

10. In a pipe-coupling, the combination of two tubular coupling-sections having projecting faces of soft material and lugs having contact portions arranged transversely to the plane of contact between the sections, and in which the lugs on one coupling-section fit to those on the other section, and clamping devices consisting of pivoted parts pivoted to one section and clamping upon the other section transversely to the plane of contact between the two sections and across the line of contact of the lugs to cause said coupling-sections to be forced together.

In testimony of which invention I hereunto set my hand.

RODNEY G. CHASE.

Witnesses:
FRED H. WILLIAMS,
FRANK M. COPELAND.